US006834882B1

(12) United States Patent
Boyd

(10) Patent No.: US 6,834,882 B1
(45) Date of Patent: Dec. 28, 2004

(54) TRAILER SYSTEM

(76) Inventor: Ellis J. Boyd, 344 2nd Bend Rd., Harleyville, SC (US) 29448

( * ) Notice: Subject to any disclaimer, the term of this patent is extended or adjusted under 35 U.S.C. 154(b) by 0 days.

(21) Appl. No.: 10/193,856

(22) Filed: Jul. 11, 2002

(51) Int. Cl.[7] .............................................. B62D 63/08
(52) U.S. Cl. .................... 280/656; 280/418.1; 280/789; 280/491.5
(58) Field of Search ................................ 280/656, 789, 280/401, 415.1, 418.1, 418, 491.5, 47.18; 296/196, 197, 27; D12/102, 104

(56) References Cited

U.S. PATENT DOCUMENTS

| | | | | |
|---|---|---|---|---|
| 3,734,525 A | * | 5/1973 | Rimbey ........................ 280/30 |
| 4,239,258 A | * | 12/1980 | Burris ......................... 280/639 |
| 4,746,142 A | * | 5/1988 | Davis .......................... 280/656 |
| 4,758,008 A | * | 7/1988 | Moddejonge ................ 280/37 |
| 5,161,814 A | * | 11/1992 | Walker ...................... 280/414.5 |
| 5,249,821 A | * | 10/1993 | Ricketts et al. ............. 280/638 |
| 5,387,001 A | * | 2/1995 | Hull et al. ................... 280/402 |
| 5,570,898 A | * | 11/1996 | Albert ......................... 280/656 |
| 6,378,893 B1 | * | 4/2002 | Jager .......................... 280/656 |
| 2003/0102655 A1 | * | 6/2003 | Thompson .................. 280/656 |

* cited by examiner

*Primary Examiner*—Avraham Lerner
(74) *Attorney, Agent, or Firm*—Michael A. Mann; Nexsen Pruet Adams Kleemeier LLC

(57) ABSTRACT

A trailer system that includes a main chassis assembly including a detachable, trailer tongue assembly that is assembled from multiple trailer tongue assembly parts; a pair of detachable ramp members each detachably connectable to the main chassis assembly; multiple fasteners; and a multi-panel enclosure assembly attachable to the main chassis assembly. The fasteners are used to secure the multiple trailer tongue assembly parts together, the multi-panel enclosure assembly together and the assembled trailer tongue assembly and the assembled multi-panel enclosure assembly to the main chassis assembly.

1 Claim, 6 Drawing Sheets

TRAILER SYSTEM

TECHNICAL FIELD

The present invention relates to trailers that are towable behind vehicles and more particularly to a trailer system that includes a main chassis assembly including a detachable, trailer tongue assembly that is assembled from multiple trailer tongue assembly parts, a pair of detachable ramp members each detachably connectable to the main chassis assembly, and a multi-panel enclosure assembly attachable to the main chassis assembly in a manner to form a sealable enclosure having an enclosure floor, left side wall, right side wall, a front wall having an aerodynamic shape, a two pivoting and lockable back doors that are held together and to the main chassis assembly with fasteners; the multiple trailer tongue assembly parts being secured together and to the main chassis assembly with fasteners prior to use; the main chassis assembly being configurable between a folded storage configuration with the detachable trailer tongue assembly disassembled and disconnected therefrom and a use configuration with the main chassis assembly unfolded and the detachable trailer tongue assembly attached thereto; when in the use configuration, the unfolded main chassis assembly being usable with just the detachable trailer tongue assembly attached thereto or with the detachable trailer tongue assembly and the multi-panel enclosure assembly attached thereto; the main chassis assembly including a central chassis portion having two axle assemblies each including an axle and two free-wheeling wheels, a forward chassis portion pivotally connected to a forward edge of the central chassis portion and having trailer tongue assembly connecting structures provided thereon, and a rear chassis portion pivotally connected to a rear edge of the central chassis portion and having two ramp member connecting structures provided at a rear end of each of two rear wheel support plate sections provided on the rear chassis portion; the central chassis portion including two central wheel support plate sections that are each in line with one of the two rear wheel support plate sections provided on the rear chassis portion; the forward chassis portion including two forward wheel support plate sections that are each in line with one of the two central wheel support plate sections provided on the central chassis portion; the forward and rear chassis portions each being separately lockable in rigid parallel orientation with the central chassis portion and pivotally positionable into a position above the central chassis portion for storage.

BACKGROUND ART

Many individuals need to tow items from place to place on a trailer but have little space for storing the trailer when the trailer is not being used. It would be desirable, therefore, to have a trailer system that would include a towing bed in the form of a main chassis assembly. To provide for convenient storage of the trailer system, it would also be desirable to have a main chassis assembly that could be folded into a storage configuration that required much less space than the unfolded main chassis assembly of the trailer system.

GENERAL SUMMARY DISCUSSION OF INVENTION

It is thus an object of the invention to provide a trailer system that includes a main chassis assembly including a detachable, trailer tongue assembly that is assembled from multiple trailer tongue assembly parts, a pair of detachable ramp members each detachably connectable to the main chassis assembly, multiple fasteners, and a multi-panel enclosure assembly attachable to the main chassis assembly in a manner to form a sealable enclosure having an enclosure floor, left side wall, right side wall, a front wall having an aerodynamic shape, a two pivoting and lockable back doors that are held together and to the main chassis assembly with a number of the fasteners; the multiple trailer tongue assembly parts being secured together and to the main chassis assembly with fasteners prior to use; the main chassis assembly being configurable between a folded storage configuration with the detachable trailer tongue assembly disassembled and disconnected therefrom and a use configuration with the main chassis assembly unfolded and the detachable trailer tongue assembly attached thereto; when in the use configuration, the unfolded main chassis assembly being usable with just the detachable trailer tongue assembly attached thereto or with the detachable trailer tongue assembly and the multi-panel enclosure assembly attached thereto; the main chassis assembly including a central chassis portion having two axle assemblies each including an axle and two free-wheeling wheels, a forward chassis portion pivotally connected to a forward edge of the central chassis portion and having trailer tongue assembly connecting structures provided thereon, and a rear chassis portion pivotally connected to a rear edge of the central chassis portion and having two ramp member connecting structures provided at a rear end of each of two rear wheel support plate sections provided on the rear chassis portion; the central chassis portion including two central wheel support plate sections that are each in line with one of the two rear wheel support plate sections provided on the rear chassis portion; the forward chassis portion including two forward wheel support plate sections that are each in line with one of the two central wheel support plate sections provided on the central chassis portion; the forward and rear chassis portions each being separately lockable in rigid parallel orientation with the central chassis portion and pivotally positionable into a position above the central chassis portion for storage.

Accordingly, such a trailer system is provided.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
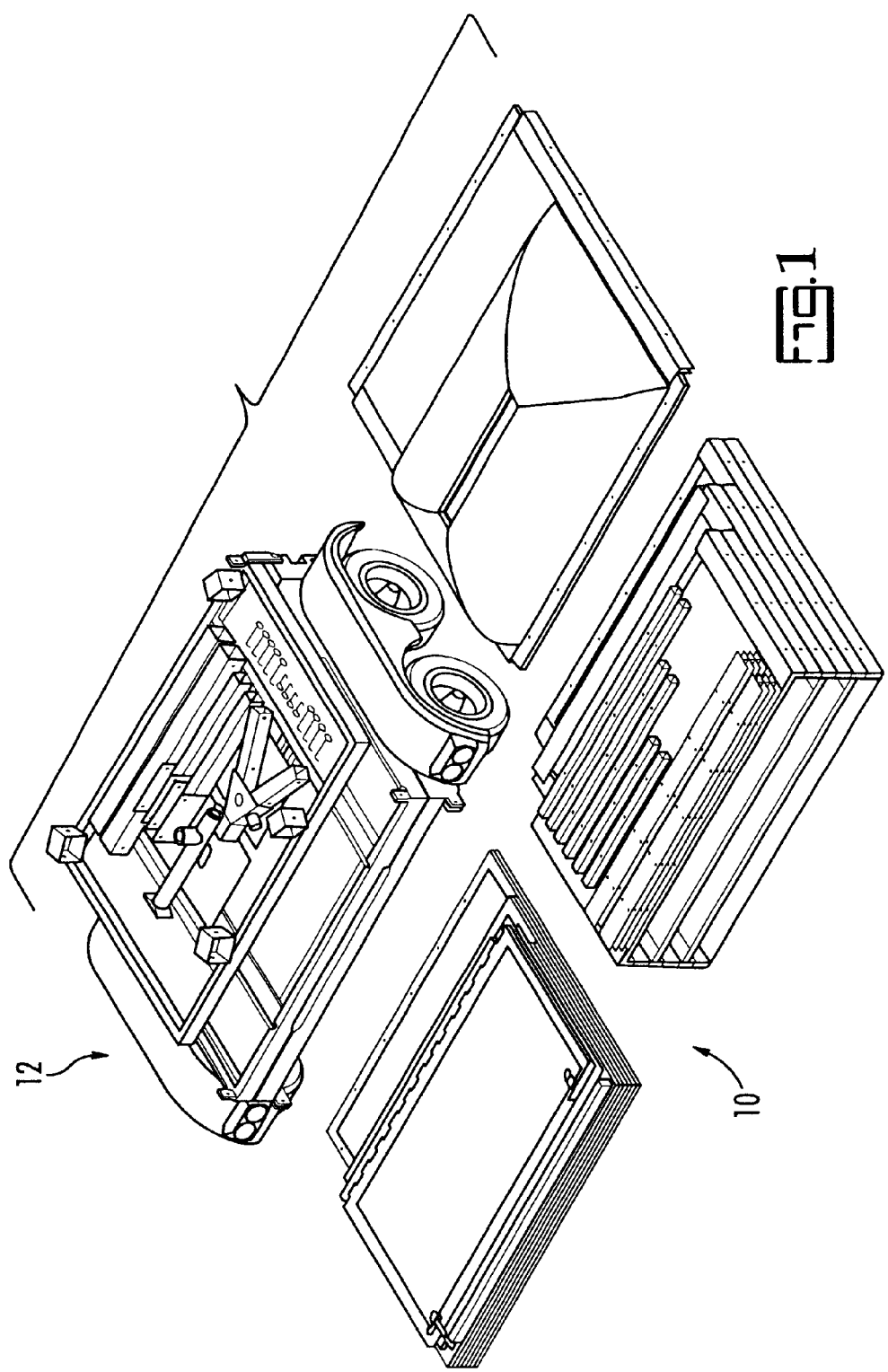
FIG. 1 is a perspective view of an exemplary embodiment of the trailer system of the present invention in the storage configuration.
Figure 2:
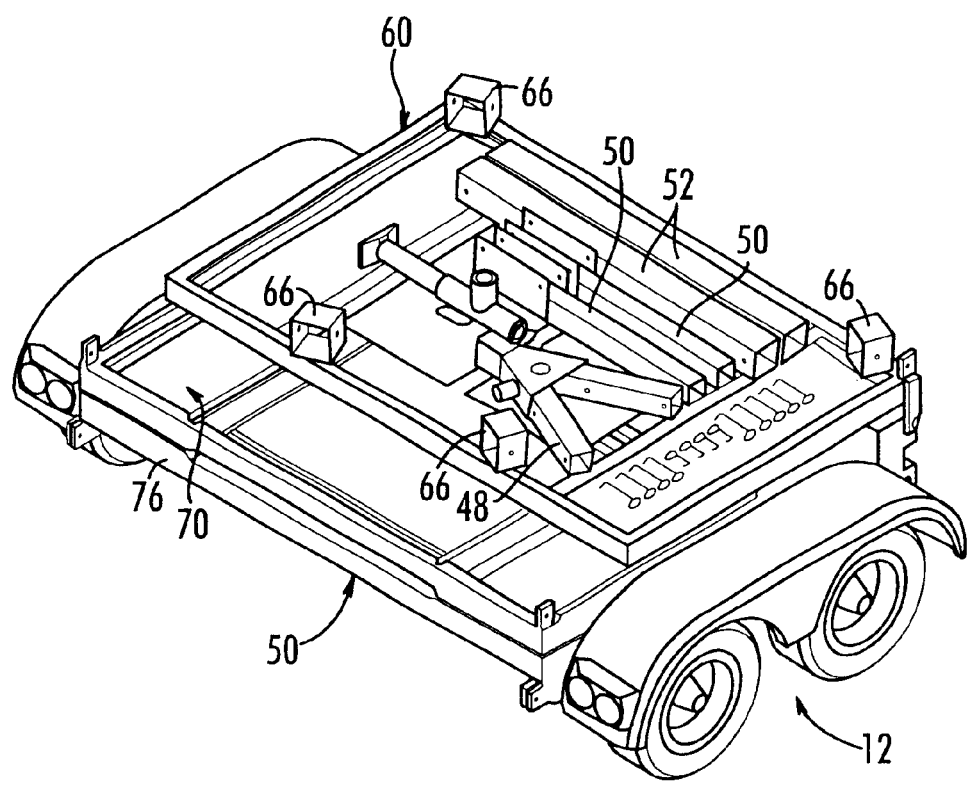
FIG. 2 is a perspective view of the main chassis assembly and the disassembled trailer tongue assembly of the exemplary trailer system of FIG. 1 in isolation.
Figure 3:
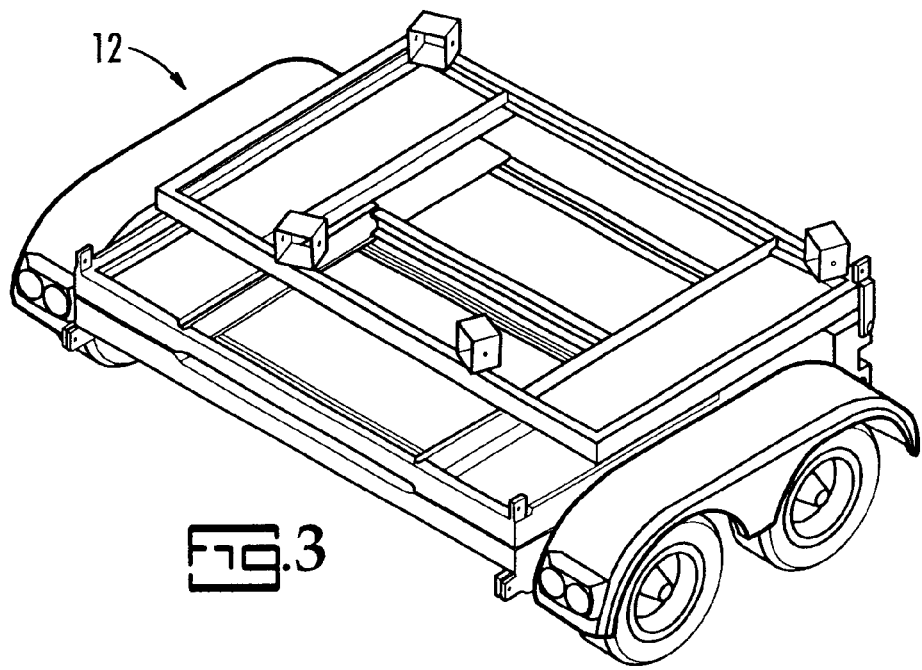
FIG. 3 is a perspective view of the main chassis assembly of the exemplary trailer system of FIG. 1 in isolation.
Figure 4:
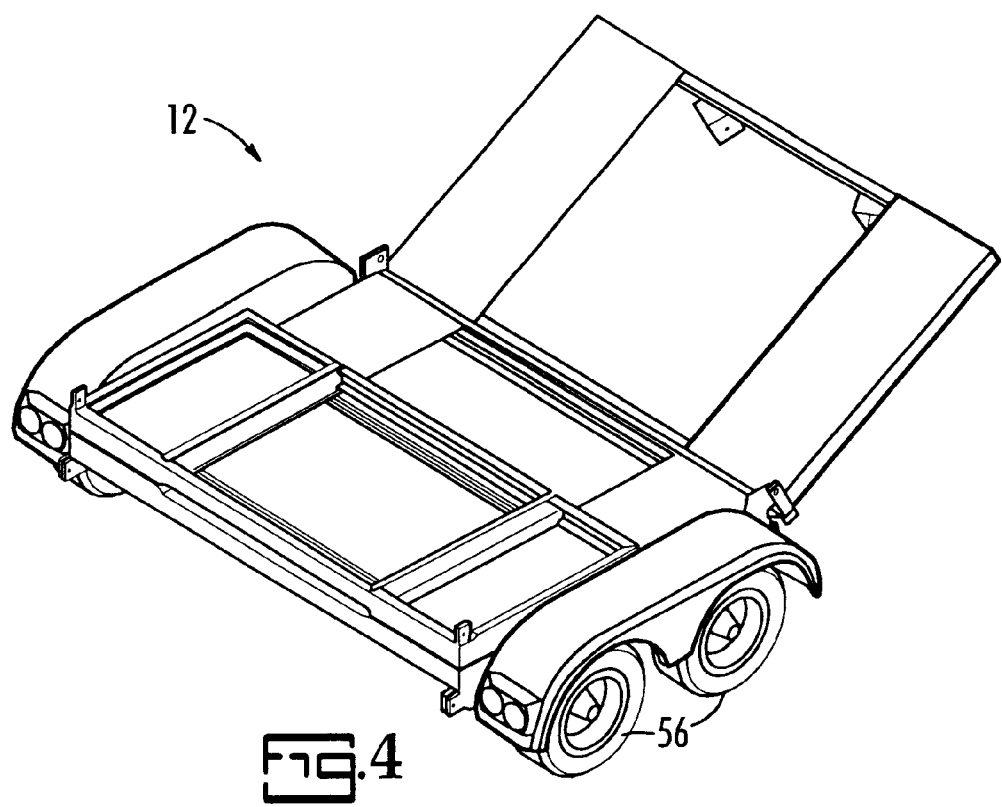
FIG. 4 is a perspective view of the main chassis assembly of the exemplary trailer system of FIG. 1 in isolation with the forward chassis portion partially unfolded into the use position and the rear chassis portion in the storage position.
Figure 5:
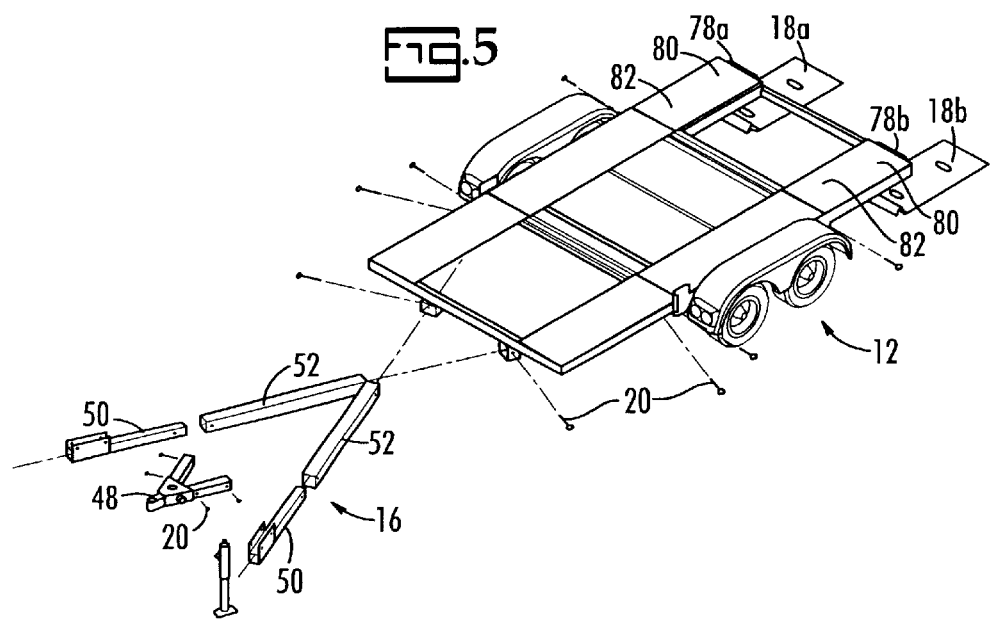
FIG. 5 is a perspective view of the main chassis assembly just prior to being locked in the unfolded use position with locking pins; the multiple trailer tongue assembly parts in an exploded disassembled configuration along with the locking pins for securing the multiple trailer tongue assembly parts together and to the main chassis assembly; and the two detachable ramp members positioned behind the two ramp member connecting structures provided at the rear end of the rear chassis portion of the main chassis assembly.
Figure 6:
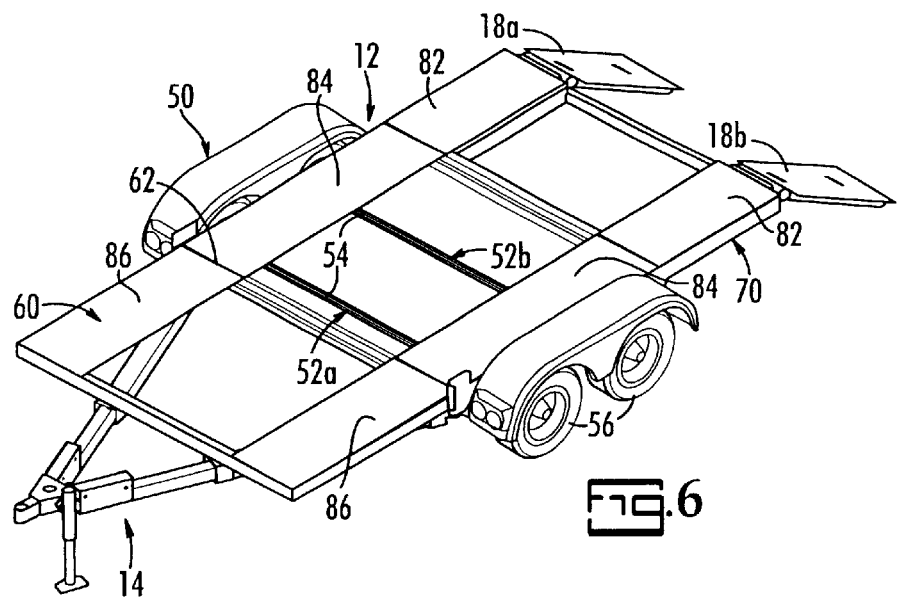
FIG. 6 is a perspective view of the main chassis assembly locked in the unfolded use position with locking pins; the multiple trailer tongue assembly parts assembled and secured to the main chassis assembly with locking pins, and each of the two detachable ramp members detachably attached to one of the two ramp member connecting structures provided at the rear end of the rear chassis portion of the main chassis assembly.
Figure 7:
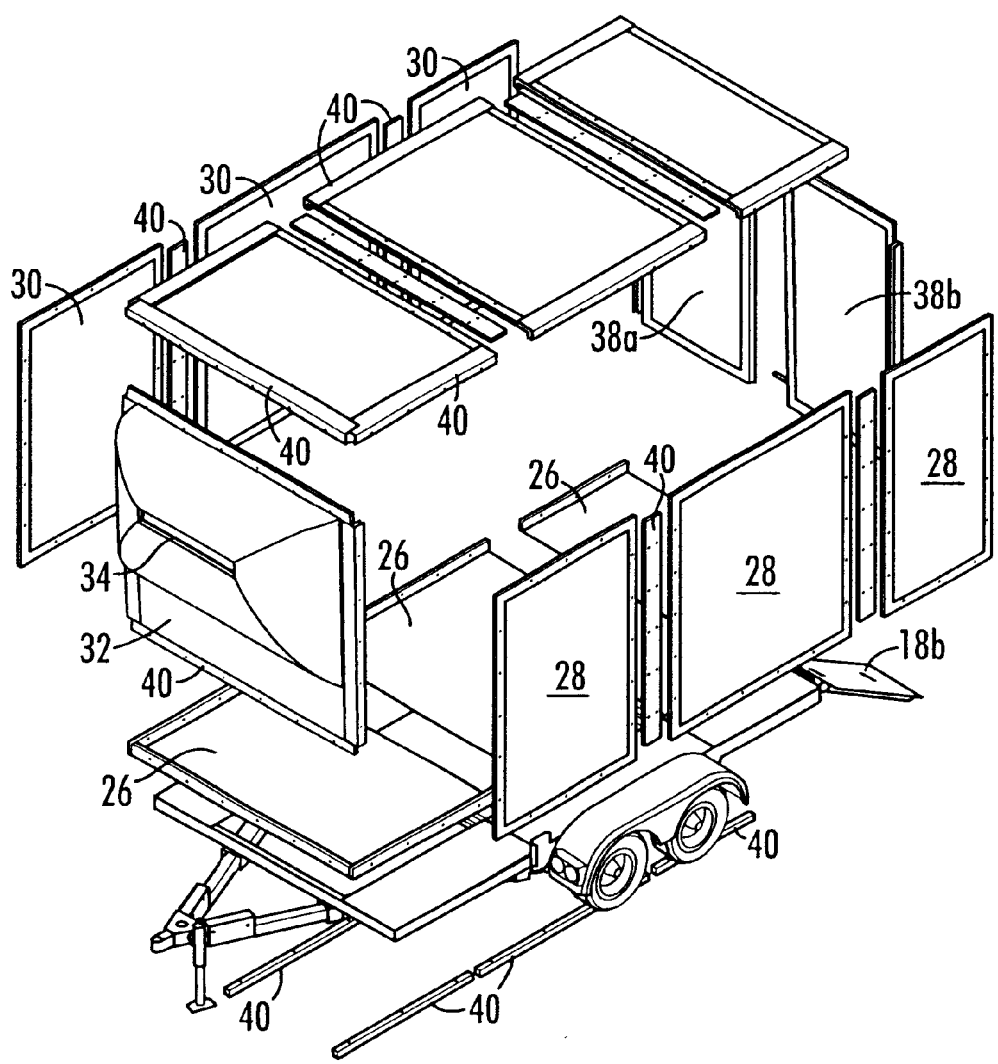
FIG. 7 is a perspective view of the trailer system of FIG. 1 with the main chassis assembly locked in the unfolded use position with locking pins; the multiple trailer tongue assembly parts assembled and secured to the main chassis assembly with locking pins; each of the two detachable ramp members detachably attached to one of the two ramp member connecting structures provided at the rear end of the rear chassis portion of the main chassis assembly; and the wall and connecting elements of the multi-panel enclosure assembly in an exploded view positioned above the main chassis assembly.
Figure 8:
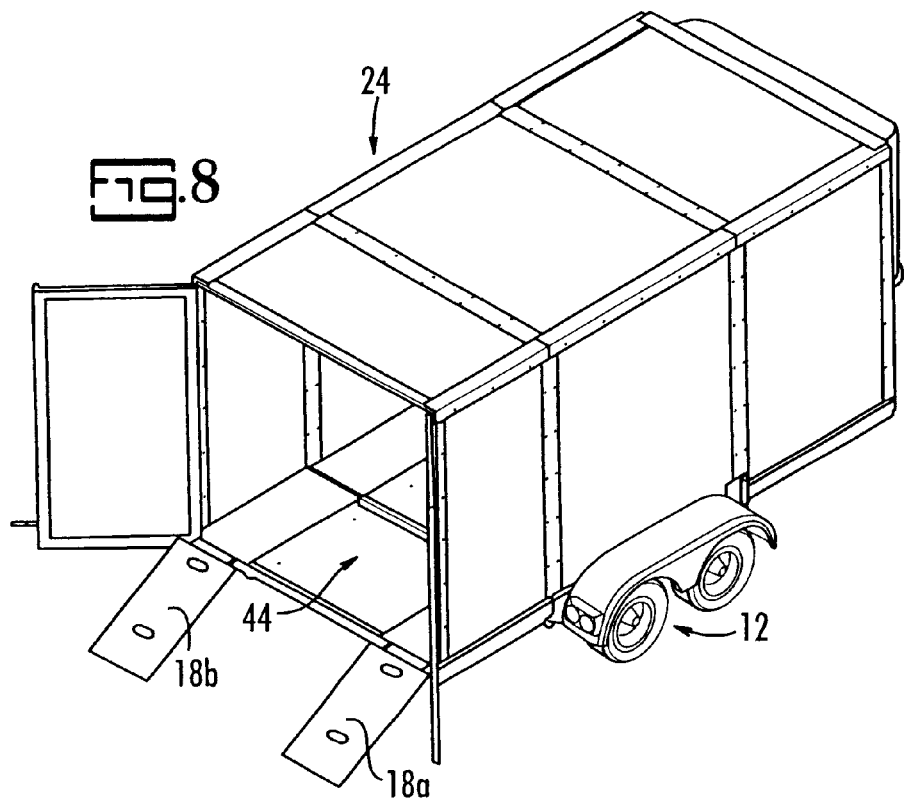
FIG. 8 and FIG. 9 are front and rear perspective views of the trailer system of FIG. 1 with the main chassis assembly locked in the unfolded use position with locking pins; the multiple trailer tongue assembly parts assembled and secured to the main chassis assembly with locking pins; each of the two detachable ramp members detachably attached to one of the two ramp member connecting structures provided at the rear end of the rear chassis portion of the main chassis assembly; and the wall and connecting elements of the multi-panel enclosure assembly secured together with locking pins to form a sealable enclosure supported on the main chassis assembly.

FIGS. 1–8 show various aspects of an exemplary embodiment of the trailer system of the present invention generally designated 10. Trailer system 10 includes a main chassis assembly, generally designated 12, including a detachable, trailer tongue assembly, generally designated 14, that is assembled from multiple trailer tongue assembly parts, generally designated 16; two detachable ramp members 18a, 18b each detachably connectable to main chassis assembly 12; multiple fasteners in the form of multiple locking pins 20; and a multi-panel enclosure assembly, generally designated 22, that includes three enclosure floor panels 26, three left side wall panels 28, three right side wall panels 30, a front wall 32 having an aerodynamic shaped upper portion 34, and two pivoting and lockable back door members 38a, 38b that are attachable together with locking pins 20 and to main chassis assembly 12 with locking pins 20 and multiple panel securing tubing sections 40 in a manner to form a sealable enclosure 44.

The multiple trailer tongue assembly parts 16 include a V-shaped hitch assembly 48, two hitch tongue tubing sections 50 and two chaissis tongue tubing sections 52 that are secured together with pins 20 and to main chassis assembly 12 with 20 prior to use of main chassis assembly 12.

Figure 9:
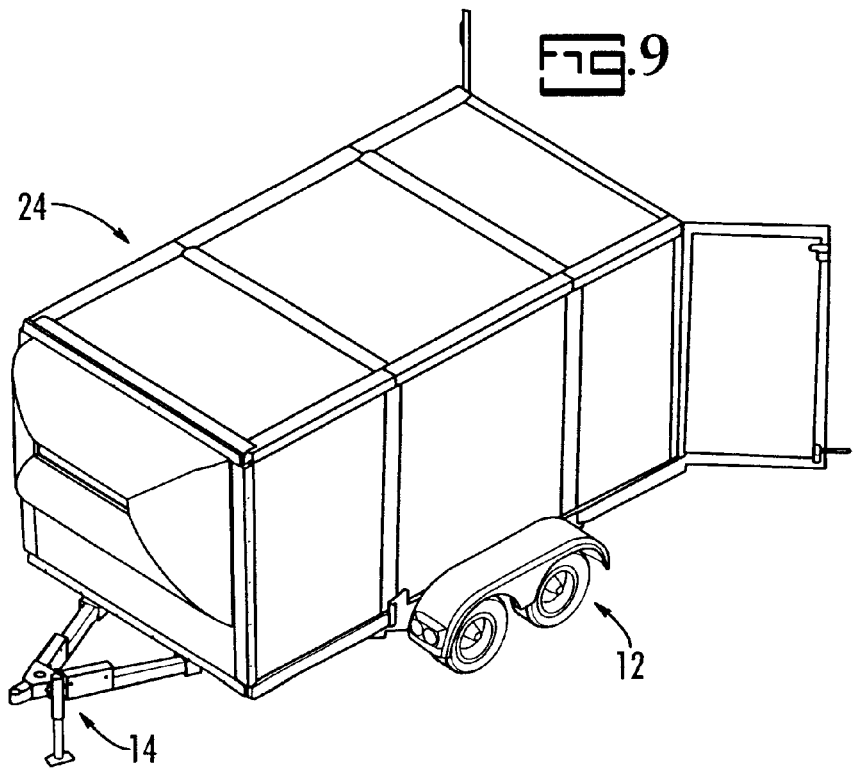

Main chassis assembly 12 is configurable between a folded storage configuration (shown in FIGS. 1–3) with the detachable trailer tongue assembly disassembled and disconnected therefrom and a use configuration (shown in FIGS. 5–9) with the main chassis assembly 12 unfolded and the detachable trailer tongue assembly 14 attached to the main chassis assembly 12.

When in the use configuration, the unfolded main chassis assembly 12 is usable for hauling wheeled vehicles, such as a four wheeler, automobile truck etc., with just the detachable trailer tongue assembly 14 attached thereto. The main chassis assembly 12 is also useable with the detachable trailer tongue assembly 14 and the multi-panel enclosure assembly 24 attached thereto.

Main chassis assembly 12 includes a central chassis portion, generally designated 50, having two axle assemblies 52a, 52b each including an axle 54 and two free-wheeling wheels 56; a forward chassis portion, generally designated 60, pivotally connected to a forward edge 62 of central chassis portion 50 and having trailer tongue assembly connecting structures 66 provided thereon; and a rear chassis portion, generally designated 70, pivotally connected to a rear edge 76 of central chassis portion 50 and having two ramp member connecting structures 78a, 78b provided at a rear end 80 of each of two rear wheel support plate sections 82 provided on the rear chassis portion 70. Central chassis portion 50 includes two central wheel support plate sections 84 that are each in line with one of the two rear wheel support plate sections 82 provided on the rear chassis portion 70. Forward chassis portion 60 includes two forward wheel support plate sections 86 that are each in line with one of the two central wheel support plate sections 84 provided on the central chassis portion 50. The forward and rear chassis portions 60, 70 are each separately lockable in rigid parallel orientation with the central chassis portion 50 with and pivotally positionable into a position above the central chassis portion 50 for storage.

It can be seen from the preceding description that a trailer system has been provided.

It is noted that the embodiment of the trailer system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A trailer system comprising:
    a main chassis assembly including a detachable trailer tongue assembly that is assembled from multiple trailer tongue assembly parts;
    a pair of detachable ramp members each detachably connectable to the main chassis assembly;
    multiple fasteners; and
    a multi-panel enclosure assembly attachable to the main chassis assembly in a manner to form a sealable enclosure having an enclosure floor, left side wall, right side wall, a front wall having an aerodynamic shape, and a pivoting and lockable back door;
    the multi-panel enclosure being held together and to the main chassis assembly with a number of the fasteners;
    the multiple trailer tongue assembly parts being secured together and to the main chassis assembly with a number of the fasteners;
    the main chassis assembly being configurable between:
        a folded storage configuration with the detachable trailer tongue assembly disassembled and disconnected therefrom; and
        a use configuration with the main chassis assembly unfolded and the detachable trailer tongue assembly attached thereto;

when in the use configuration, the unfolded main chassis assembly being usable with just the detachable trailer tongue assembly attached thereto or with the detachable trailer tongue assembly and the multi-panel enclosure assembly attached thereto;

the main chassis assembly including a central chassis portion having two axle assemblies each including an axle and two free-wheeling wheels, a forward chassis portion pivotally connected to a forward edge of the central chassis portion and having trailer tongue assembly connecting structures provided thereon, and a rear chassis portion pivotally connected to a rear edge of the central chassis portion and having two ramp member connecting structures provided at a rear end of each of two rear wheel support plate sections provided on the rear chassis portion;

the central chassis portion including two central wheel support plate sections that are each in line with one of the two rear wheel support plate sections provided on the rear chassis portion;

the forward chassis portion including two forward wheel support plate sections that are each in line with one of the two central wheel support plate sections provided on the central chassis portion;

the forward and rear chassis portions each being separately lockable in rigid parallel orientation with the central chassis portion and pivotally positionable into a position above the central chassis portion for storage.

* * * * *